United States Patent [19]

McDaniel et al.

[11] 4,444,963

[45] Apr. 24, 1984

[54] POLYMERIZATION PROCESS USING CATALYSTS COMPRISING CHROMIUM ON SILICA/PHOSPHATE SUPPORT

[75] Inventors: Max P. McDaniel; Marvin M. Johnson, both of Bartlesville, Okla.

[73] Assignee: Phillips Petroleum Company, Bartlesville, Okla.

[21] Appl. No.: 423,595

[22] Filed: Sep. 27, 1982

Related U.S. Application Data

[62] Division of Ser. No. 221,746, Dec. 31, 1980, Pat. No. 4,364,839.

[51] Int. Cl.$^3$ .............................. C08F 4/02; C08F 4/24; C08F 4/62
[52] U.S. Cl. ............................ 526/100; 502/155; 526/105; 526/106; 526/129; 526/352
[58] Field of Search ................. 526/100, 105, 106, 129

[56] References Cited

U.S. PATENT DOCUMENTS

| | | | |
|---|---|---|---|
| 2,938,001 | 5/1960 | de Rosset | 252/432 |
| 3,211,801 | 10/1965 | Holm et al. | 260/683.2 |
| 3,271,299 | 9/1966 | Kearby | 208/114 |
| 3,342,750 | 9/1967 | Kearby | 252/437 |
| 3,453,219 | 7/1969 | O'Hara | 252/432 |
| 3,780,011 | 12/1973 | Pullukat et al. | 252/430 |
| 3,907,849 | 9/1975 | Meyer | 252/431 P |
| 3,985,676 | 10/1976 | Rekers et al. | 252/428 |
| 4,118,340 | 10/1978 | Rekers | 252/428 |
| 4,192,775 | 3/1980 | Rekers et al. | 252/430 |
| 4,248,735 | 2/1981 | McDaniel et al. | 252/428 |

FOREIGN PATENT DOCUMENTS 2017521  3/1978  United Kingdom .

*Primary Examiner*—Stanford M. Levin

[57] ABSTRACT

In one embodiment of this invention, a chromium component is supported on a silica/aluminum orthophosphate combination and used with an organometal cocatalyst. In accordance with other embodiments of the invention, the silica/phosphate combination for a chromium catalyst support is produced by either impregnating a silica xerogel with aluminum phosphate or boron phosphate, precipitating aluminum phosphate in the presence of a silica hydrogel, or physically mixing silica and aluminum phosphate xerogels. The resulting catalysts are capable of producing high melt flow olefin polymers and exhibit high activity. The resulting polymers have many unusual and desirable characteristics, such as high density and good environmental stress crack resistance.

23 Claims, No Drawings

POLYMERIZATION PROCESS USING CATALYSTS COMPRISING CHROMIUM ON SILICA/PHOSPHATE SUPPORT

CROSS REFERENCE TO RELATED APPLICATION

This is a divisional of copending application Ser. No. 221,746, filed Dec. 31, 1980, U.S. Pat. No. 4,364,839.

BACKGROUND OF THE INVENTION

This invention relates to a phosphate supported chromium catalyst for olefin polymerization.

Supported chromium oxide catalysts can be used to prepare olefin polymers in a hydrocarbon solution to give a product having excellent characteristics from many standpoints. Silica supported chromium oxide catalysts can also be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in the solution process, control of the molecular weight can be effected by changing the temperature with lower molecular weight (higher melt flow) being obtained at the higher temperature. However, in the slurry process, this technique is inherently limited since any efforts to increase the melt flow to any appreciable extent by increasing temperature would cause the polymer to go into solution and thus destroy the slurry or particle-form process. It is known to extend the range of melt flow capability of a given catalyst through the use of oxygen. However, it has not heretofore been commercially feasible to produce a complete spectrum of polymers so far as melt flow is concerned in a slurry system with a single chromium catalyst system. Also it is frequently desired to have a polymer with greater shear response than is normally obtained in the slurry or particle-form process.

While it has long been known to use metal phosphates as supports for chromium olefin polymerization catalysts, such supports have never achieved commercial success. Thus chromium catalysts are generally supported on silica-containing bases similar to those used decades ago when the chromium catalyzed polymerization of olefin polymers first became commercial.

SUMMARY OF THE INVENTION

It is an object of this invention to provide a catalyst capable of giving both high melt flow and high shear response;

It is a further object of this invention to provide a catalyst suitable for use in slurry polymerization systems;

It is yet a further object of this invention to provide a catalyst capable of giving polymer suitable for blow molding, film and other applications requiring good melt strength;

It is yet a further object of this invention to provide a catalyst capable of producing olefin polymers having unexpectedly high flexural modulus;

It is yet a further object of this invention to provide a single catalyst system capable of giving a broad spectrum of polymers so far as melt flow is concerned;

It is a further object of this invention to provide an improved metal phosphate supported chromium catalyst system for olefin polymerization;

It is yet a further object of this invention to provide a catalyst system having unusual sensitivity to molecular weight control agents such as hydrogen; and It is still yet a further object to provide a catalyst capable of producing polymer having unusually broad molecular weight distribution.

In accordance with one embodiment of this invention, a chromium component is supported on a silica/aluminum orthophosphate combination and used with an organometal cocatalyst. In accordance with a second embodiment, a silica/metal orthophosphate combination for a chromium catalyst support is achieved by impregnating a silica hydrogel or xerogel with aluminum orthophosphate or boron orthophosphate. In accordance with a third embodiment, the silica/aluminum orthophosphate combination for a chromium catalyst is achieved by precipitating aluminum phosphate in the presence of a silica hydrogel or xerogel. In a fourth embodiment, the silica/aluminum orthophosphate combination for a chromium catalyst is achieved by physically mixing silica xerogel with aluminum orthophosphate xerogel. In this invention, boron is classified as a metal for convenience.

DESCRIPTION OF THE PREFERRED EMBODIMENTS

The silica/metal phosphate combination can be made in four separate ways.

First, the two can be coprecipitated as is known in the art, for instance as shown in Kirby, U.S. Pat. No. 3,342,750 (Sept. 19, 1967), the disclosure of which is hereby incorporated by reference. In accordance with this technique, a silicate is combined with a source of aluminum ions and a source of phosphate ions and neutralized to form a cogel. The silicate is preferably a tetrahydrocarbyl orthosilicate, such as ethyl silicate, although sodium silicate can also be used. The aluminum component is preferably aluminum nitrate although aluminum chloride or other aluminum salts can be used. The source of phosphate ions is preferably orthophosphoric acid although dihydrogen ammonium phosphate, and hydrogen diammonium phosphate, for instance, can also be used. This reaction is generally carried out in an aqueous medium although a polar organic solvent can be used. It is frequently preferred that a small amount of a boron compound such as boric acid be introduced into the reaction mixture to be coprecipitated with the aluminum phosphate and silica. Other suitable boron compounds include borates such as ammonium borate. By coprecipitated as it relates to the boron compound, it is meant that the silica/aluminum phosphate is formed into a hydrogel in the presence of the boron compound. It is not known to what extent the boron compound becomes incorporated into the hydrogel structure. The amount of boron compound present when the silica/aluminum phosphate cogel is formed can vary widely but it is generally used in an amount so as to give 0.5 to 15 mole percent boron based on the moles of phosphorus.

While any agent which neutralizes acid can be used, a base such as concentrated ammonium hydroxide, ammonia gas, or ammonia dissolved in alcohol or other nonaqueous solvents is preferred. Also ammonium carbonate, ethylene oxide and propylene oxide can be used.

The neutralization can be carried out either by adding the acid phase (metal salt/phosphate source combination) to the base phase or vice versa. One suitable practice is to drip or spray or otherwise slowly add the acid phase into the base phase. It is preferred that the gellation occur at a pH of at least 5, preferably at least 6. Generally the pH when the gellation occurs will be in the range of 5 to 10, more generally 6 to 7. However, in this embodiment as in embodiment three described hereinbelow, gellation can occur after any partial neutralization at which point the composition is acidic.

Gellation occurs spontaneously at a pH of about 4, which is achieved by combining about 72 percent of the neutralizing agent, and it has been found that this is undesirable. Therefore, neutralization is preferably achieved by either: (1) combining slowly with stirring about 72 percent of the amount of neutralizing agent needed for complete neutralization and thereafter quickly adding the rest so as to go quickly through the 4–5 pH range and achieve gellation at a pH of 5 or greater, preferably at least 6, generally 6 to 10, or (2) combining 60 to 70 percent of the neutralizing agent needed for complete neutralization and aging until gellation occurs which will generally be 1 minute to 48 hours, more generally 5 minute to 10 hours, more generally 10 minutes to 3 hours; thus, gellation occurs at a pH below 4, generally about 2.

It may be desirable in some instances to coprecipitate other materials such as titania with the silica/phosphate cogel or have other materials present during the gellation. Also, the chromium compound such as chromium nitrate can be introduced with the reactants.

It is preferred to remove water by azeotropic distillation or by washing with a volatile, water miscible, low surface tension organic liquid. If water is not employed as a solvent, any small amount of water carried over from water of hydration of from the base used in neutralization can be removed by conventional spray drying, tray drying or oven drying, thus avoiding the necessity for azeotropic distillation. However, even in these situations, if it is desired to water wash the hydrogel, then azeotropic distillation or washing with a volatile oxygen-containing water-miscible solvent is desirable. After water removal to convert the hydrogel to a xerogel, the xerogel is activated by calcination in an oxygen-containing ambient.

In accordance with the second method of making the silica/phosphate composition, a silica hydrogel or xerogel is impregnated with aluminum orthophosphate. This can be carried out by combining the source of aluminum ions and phosphate ions with a slurry of silica hydrogel or xerogel and then evaporating the solvent by conventional techniques such as oven drying or more preferably by spray drying. To a substantial extent it is believed the aluminum phosphate forms within the pores of the silica. Alternatively, the source of aluminum and phosphate ions can be adsorbed into the dry silica. This is largely a physical impregnation and entrapment of the phosphorus component in the pores of the silica. When a silica xerogel is used, instead of evaporating to dryness, the evaporation can stop when the liquid in excess of the pore volume is gone but some liquid remains in the pores, or an amount of liquid equal to or less than the pore volume can be added initially and the gel formed by adding a neutralizing agent. Even when the precipitate is formed by evaporation to dryness, a neutralizing agent can subsequently be added but it is not essential. When the liquid is not evaporated to dryness and the phosphate gel is formed in the pores of silica xerogel by neutralization, the impregnated silica can sometimes be directly activated but preferably the material is dried at a slightly elevated temperature before being activated. No azeotrope drying is required, simple oven drying, for instance, being satisfactory, although azeotrope drying could be used if desired.

As to the scope of the aluminum and phosphorus components, the base when used, and the solvent, is the same as that set out hereinabove with regard to the first embodiment. One difference in scope between these two embodiments is that in this embodiment ammonium borate or boric acid can be substituted for part or all of the aluminum salt in the technique where the solvent is evaporated so as to form what is believed to be boron phosphate onto the silica on evaporating the solvent. If a base is used to form the phosphate, a boron compound can be present as in the first embodiment.

In accordance with the third embodiment of forming the silica/phosphate base, aluminum orthophosphate is precipitated in the presence of a silica hydrogel or xerogel. This results in forming the silica as a dispersed phase in an aluminum phosphate matrix as opposed to having the aluminum phosphate impregnated into the pores of the silica. In accordance with this method, a source of aluminum and phosphate ions are combined with a silica hydrogel or xerogel and the aluminum phosphate formed by combining with a neutralizing agent. The scope of the ingredients is the same as in the first embodiment hereinabove except monobasic ammonium phosphate is the preferred source of phosphate ions. As with the first embodiment, a boron compound can be present during the precipitation of the aluminum phosphate. Also, the same pH considerations of the first embodiment apply. Finally, as with the first embodiment, the free water is preferably removed by azeotropic distillation or washing with a water miscible organic liquid to convert the hydrogel to a xerogel preparatory to activating. The dried support is then ready for activation. In the case of a xerogel, the phosphate ingredients must be greater than one pore volume as it is the same as the second embodiment.

In accordance with the fourth embodiment for making the silica/aluminum orthophosphate composition, a silica xerogel and an aluminum phosphate xerogel are simply physically mixed. The scope of the ingredients for making the separate silica and aluminum phosphate are the same as those used in embodiment 1 for making the cogel. More broadly, any known method of making silica suitable for use as a base olefin polymerization catalysts and any known methods of making aluminum orthophosphate having relatively high surface area can be used for producing the silica and aluminum orthophosphate, respectively. In addition, the aluminum orthophosphate can be made by forming a melt of an easily melted aluminum salt such as hydrated aluminum nitrate, adding a source of phosphate ions of the same scope as that utilized in embodiment 1 to the melt, and neutralizing with a base having the same scope as that set out for embodiment 1. The resulting silica and aluminum orthophosphate xerogels can simply be ground together or blended in a conventional dry blender or mixed in a slurry with a nonreactive diluent such as a hydrocarbon. In making the phosphate, the same pH considerations of the first embodiment apply.

The two most preferred methods of achieving this mixture are as follows. First, the silica and aluminum orthophosphate in powder form are simply charged to the activator together with the fluidization normally employed during the activation serving to effect the mixing. Alternatively, the silica and aluminum phosphate may be separately activated and the ultimate chromium-on-silica and chromium-on-aluminum phosphate catalysts added separately to the reactor, (or mixed after activation but prior to introduction) thus allowing precise control of the amounts of each utilized.

The aluminum and phosphorus components of the aluminum orthophosphate are selected so as to give an atom ratio of phosphorus to aluminum within the range of 0.2:1 to 1:1, preferably 0.6:1 to 0.9:1.

Further with respect to the relative proportions in all embodiments, except embodiment 2, the silica and metal orthophosphate will generally be used in molar ratios of 10:1 to 1:20 moles of silica per mole of phosphate (or gram atom of phosphorus), more commonly, 2:1 to 1:2 moles of silica per mole of phosphate (or gram atom of phosphorus).

In embodiment 2 where the silica is impregnated with the metal orthophosphate, from about 1 to 50 mole percent metal phosphate based on the moles of silica is used, more preferably 5–25 mole percent.

Because the different supports, particularly when employed in conjunction with a boron-containing cocatalyst, have different effects on the structure of the ultimate polymer, adjustment of the ratio of silica to metal phosphate in the support can be utilized to effect quality control of the ultimate product.

The chromium can be coprecipitated as noted hereinabove. Alternatively, a water soluble chromium compound such as chromium nitrate, chromium acetate, or $CrO_3$ can be added to the hydrogel. Alternatively, a chromium compound preferably dissolved in an anhydrous solvent such as a hydrocarbon can be used to impregnate the xerogel. Suitable chromium compounds for such anhydrous impregnation include tertiary-butyl chromate. The chromium compounds are used in amounts sufficient to give 0.001 to 10, preferably 0.1 to 5, more preferably about 1 weight percent chromium based on the weight of the xerogel base after activation is completed.

The term xerogel is used to refer to the gel resulting from the removal of free water from the hydrogel.

The activation of the xerogel can be carried out at temperatures known in the art although the phosphate base can be activated at slightly lower temperatures, for instance temperatures of 150°–800°, preferably 300°–800°, more preferably 400°–600° C. are particularly suitable for the phosphate component, as compared with the 450°–1000° C. temperature generally employed for silica bases. Thus broadly any temperature from 150°–1000° C. can be used. In the embodiment where the xerogels are physically mixed after the supports are separately activated, each can be activated at the optimum temperature for that particular support. In the other embodiments, either the preferred activation temperature for silica or the preferred activation temperature for phosphate can be utilized.

The activating ambient can be any oxidizing ambient but for convenience and economy an oxygen-containing ambient such as air is preferred. The chromium is at least predominantly in the hexavalent state after activation. If an excess of chromium over what is required is used, the excess may not be in the hexavalent state, if it remains on the catalyst at all. Times of 2 minutes to 48 hours, preferably 0.5 to 10 hours are suitable for the activation or calcination step. The chromium is thought to be reduced in the polymerization zone by the monomer, probably to plus two oxidation state. If desired, this reduction can be carried out before the catalyst is contacted with the monomer, for instance in the activator. Hexavalent chromium can be added to the activated base or bases from an anhydrous solution but generally the chromium is introduced prior to activation and hence is converted to the hexavalent state from whatever valence it may have had initially, be that 0 or a higher valence, although as noted hereinabove one of the preferred chromium components for addition prior to activation is $CrO_3$ which is already in the hexavalent state. Thus, the chromium is in, or is convertible to the hexavalent state when introduced into the reactor. If hexavalent chromium is added to the support after activation, which is less preferred, and if done must be done anhydrously, then the activation ambient does not have to be oxygen-containing but can be any dry ambient including reducing ambients such as CO, inert ambients such as nitrogen or even a vacuum. However, if this is done, a second activation using the oxidizing ambient is required to burn off organic matter.

The cocatalyst, when used, is an organometal compound, preferably a trihydrocarbylborane, more preferably trialkylborane, the alkyl groups preferably having 1 to 12, more preferably 2 to 5, carbon atoms per group. Triethylborane, tripropylborane, and tri-n-butylborane are especially preferred. Tri-n-butylborane is most preferred because it is believed to give greater MI (Melt Index) increase than the others tested. Other boron compounds such as boron alkoxides, for instance $B(C_2H_5)_2OC_2H_5$, alkyl haloboron compounds, for instance $BC_2H_5Cl_2$, aryl borons such as triphenylborane and metal aryl borate ($MBR_4$) can also be used. Conventional organoaluminum cocatalysts such as triethylaluminum are sometimes desirable either alone or in combination with the organoboron compound.

The cocatalyst when used is utilized in an amount so as to give an atom ratio of metal such as boron to chromium within the range of 0.5:1 to 10:1, preferably 2:1 to 5:1. Based on the solvent or diluent employed during polymerization if any, the amount of metal compound cocatalyst is generally within the range of 0.5 to 20, preferably 2 to 10 parts by weight per million parts by weight of the solvent, these amounts being based on the total reactor contents in instances where no solvent or diluent is utilized. The cocatalyst can either be premixed with the catalyst or added as a separate stream to the polymerization zone, the latter being preferred. Since the boron-containing cocatalyst has a particularly dramatic effect on the metal phosphate base, in the embodiment where the silica based catalyst and the phosphate based catalyst are added separately, the cocatalyst may be premixed with the phosphate base catalyst component if desired.

The catalyst of this invention can be further treated in the same manner as chromium on conventional silica catalysts are sometimes given special treatments, such as being fluorided or being reduced and reoxidized as disclosed in McDaniel et al, U.S. Pat. No. 4,151,122 (Apr. 24, 1979), the disclosure of which is hereby incorporated by reference.

The catalyst of this invention comprising a chromium compound on a silica/phosphate xerogel base can be used to polymerize at least one mono-1-olefin containing 2 to 8 carbon atoms per molecule. The invention is of particular applicability in producing ethylene homopolymers and copolymers from mixtures of ethylene and one or more comonomers selected from 1-olefins containing 3 to 8 carbon atoms per molecule. Exemplary comonomers include aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably 96 to 99.7 weight percent polymerized ethylene units and 0.3 to 4 weight percent comonomer. Propylene, 1-butene, 1-pentene, 1-hexene, and 1-octene are especially preferred comonomers.

The polymers can be prepared from the catalyst of this invention by solution polymerization, slurry polymerization, and gas phase polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed including the production of ethylene polymers in a particle form process as disclosed in U.S. Pat. No. 3,624,063 which issued Nov. 30, 1971 to Witt, the disclosure of which is hereby incorporated by reference.

The catalyst of this invention is particularly suitable for use in slurry polymerization systems to produce a complete spectrum of polymers so far as melt flow is concerned, utilizing a single catalyst. Everything from blow molding grade resins which may require a melt index of as little as 0.1 or less to paper coating and injection molding grade resins which may require a melt flow of 20 or greater can be produced from a single catalyst system simply by the use of a molecular weight control agent, such as hydrogen. While hydrogen is known as a molecular weight control agent, the metal phosphate base component of the catalyst of this invention displays an extraordinary sensitivity to hydrogen so that by controlling the amount of hydrogen utilized, polymers having a very high molecular weight as indicated by low melt flow, through polymers having a very low molecular weight as indicated by high melt flow can be obtained. This can further be fine tuned by varying the ratio of silica support to phosphate support in the catalyst component. Further control of melt flow can be obtained by the small amount of leeway in temperature control and by the known effect of higher catalyst activation temperature causing the melt flow of the resulting polymer to be higher. However, yet a further advantage of this invention is that a single activation temperature for the catalyst and a single polymerization temperature can be utilized and still obtain a broad spectrum of polymers utilizing a single catalyst.

With slurry polymerization of ethylene and predominantly ethylene copolymer systems, the feasible temperature range is generally about 200°–230° F. (93°–110° C.) and the commercial systems are generally run as close to the maximum as possible, i.e. 225° F.±5° F. (107° C.±3° C.) in order to get the highest possible melt index. The catalyst of this invention allows running at the low end of the possible temperature range, i.e., 205° F.±5° F. (96° C.±3° C.) in systems normally employing 225° F. (107° C.). The lower temperature gives a relatively higher monomer partial pressure, thus giving higher activity.

Catalysts of this invention have the further advantage of the metal phosphate component not having any measurable induction time between initial contact with the monomer and the initiation of polymerization.

When hydrogen is used in the prior art, it is generally used at partial pressures up to 120 psia (0.83 MPa), preferably within the range of 20 to 70 psia (0.14 to 0.48 MPa). Similar amounts are used in accordance with this invention, although because of the high sensitivity to hydrogen, it is possible to use slightly smaller amounts.

The tendency of the metal phosphate component of the catalysts of this invention to produce higher melt flow polymers when hydrogen is utilized corresponds to the tendency of other catalyst systems to produce higher melt flow polymers when hydrogen is utilized, the difference being that the metal phosphate component of the catalyst of this invention is extraordinarily sensitive to the effects of hydrogen. In other areas, the metal phosphate component of the catalyst of this invention acts in a manner different from the prior art catalysts. For instance, boron cocatalysts sometimes are used in the prior art in spite of the fact that they tend to have an adverse effect on melt flow, i.e., cause the melt flow to drop. However, the boron cocatalysts of this invention substantially increase the melt flow capability of the metal phosphate component of the catalyst. Thus, by varying the amount of metal phosphate component which increases melt flow and the amount of silica component which decreases melt flow when used in conjunction with the boron cocatalysts, a novel method of broadening the molecular weight distribution is provided. Also, the use of hydrogen broadens the molecular weight distribution because, while it reduces the molecular weight with both silica and phosphorus bases, the effect is minor with the silica component and dramatic with the phosphate.

It is known in the art that the presence of a comonomer in ethylene polymerization may increase the melt flow of the resulting polymer. However, the metal phosphate component of the catalyst of this invention causes this effect to be unexpectedly magnified, with only small amounts of comonomer giving larger increases in melt flow of the resulting polymer. Thus, this allows the use of comonomer addition as a method of controlling melt flow. If the object is to produce a polymer which is essentially a homopolymer, 0.001 to 0.3, preferably 0.01 to 0.1 mole percent comonomer based on the moles of ethylene in the feed can be utilized. If the object is to produce a copolymer, 0.5 to 20 mole percent or more can be used, although enough to give 0.4 to 3 weight percent incorporation is preferred.

Another area in which the prior art olefin polymers always represent a compromise in properties is with regard to shear response. For certain applications, a high shear response as evidenced by the ratio of high load melt index to melt index, is desirable. This has heretofore been associated with broad molecular weight distribution as determined by size exclusion chromatography, for instance. Unexpectedly, the polymers produced by the catalysts of this invention exhibit a high shear response as evidenced by high HLMI/MI ratios indicating relatively broad molecular weight distribution. Molecular weight distribution or heterogeneity index (HI) as indicated by $M_w/M_n$ where $M_w$ refers to weight average molecular weight and $M_n$ refers to number average molecular weight is determined by size exclusion chromatography. In this regard, it must be kept in mind that HLMI/MI ratios are meaningful only if compared on a comparable melt index basis. The reference herein to melt index (MI) refer to ASTM D1238-65T, Condition E, and to high load melt index (HLMI) refer to ASTM D1238-65T, Condition F, the difference being a 21,600 gram weight was used in the high load test and a 2,160 gram weight was used in the regular melt index test, the temperature being 190° C. in each instance when the tests are utilized for predominantly ethylene polymers and copolymers.

EXAMPLE I

This is an example of a silica/metal phosphate support made by the cogel method. A 50/50 mole percent $SiO_2/AlPO_4$ cogel having 10 percent solids was made by simultaneously adding the following ingredients.

(1) 187.5 grams $Al(NO_3)_3.9H_2O$ in water.
(2) 34.6 mL orthophosphoric acid.
(3) 104 grams $Si(OEt)_4$ (111.3 mL).
(4) 18 grams water.
(5) 20 mL isopropyl alcohol.

The above ingredients were chosen so as to give 61 grams aluminum orthophosphate and 30 grams of $SiO_2$, i.e., one-half mole each. Thereafter approximately 200 mL of concentrated ammonium hydroxide were added which produced a thick gel at a pH of about 6–7 which then turned soupy at a pH of about 9 (the ideal pH of 6–7 was slightly overrun). It was filtered to make a cake.

One-half of the hydrogel was dried in an oven to form the basis for runs 1 and 2, the other half was azeotrope dried using isoamyl alcohol to form the basis for runs 3, 4, and 5. Each finished, calcined catalyst contained 1 percent chromium from chromium acetate in alcohol which was added to the xerogel. Each catalyst was activated in air at 700° C. after addition of the chromium acetate and tested for polymerization at 205° F. The results are shown hereinbelow in Table I.

cocatalyst, give good results as shown by Example IA hereinafter. As can be seen, the catalysts of this invention produce a broad molecular weight distribution polymer and give hydrogen sensitivity intermediate between that of chromium oxide supported on pure $SiO_2$ and pure $AlPO_4$.

The details of the polymerization for the above and the following examples is as follows. Each run was conducted in a clean, dry, air-free, stirred stainless steel reactor of about 2 L capacity. About 600 g of isobutane was used in each run as diluent with a catalyst charge ranging from about 0.03 to 0.8 gram. The reactor and its contents were heated to the desired operating temperature, ethylene pressure added to give about 565 psia (3.9 MPa), and the run was started immediately. Ethylene pressure was maintained during the run by supplying additional ethylene as required from a pressurized reservoir. Each run was terminated by stopping the ethylene flow and venting the gaseous reactor contents to a flare line for disposal. The polymer was recovered, dried and weighed to determine catalyst productivity which is set out in terms of grams polymer per gram of catalyst for the run time employed.

EXAMPLE IA

This is another example of a silica/metal phosphate support made by the cogel method. In this preparation, 94 g of aluminum nitrate, specifically $Al(NO_3)_3.9H_2O$, plus 23 g of $H_2NH_4PO_4$ plus 2.4 g of $Cr(NO_3)_3.9H_2O$ were mixed with a solution of: 13 mL isopropanol plus 5 mL $H_2O$ plus 5 drops $H_3PO_4$ plus 23 mL ethyl silicate plus 1 drop $H_2SO_4$ to make a clear solution. Then 55 mL of concentrated ammonium hydroxide were added to effect gellation.

The gel was dried in a vacuum oven, washed two times with water and filtered, then washed two times with isopropanol and filtered after which it was again dried in a vacuum oven. It was activated at 500° C. in air for 5 hours to give 1 weight percent chromium based on the dry support.

Polymerization was carried out at 205° F. (96° C.) with 4 ppm by weight triethylboron based on the weight of the reactor contents.

The results were as follows:

TABLE I

| Run No. | Drying Method | % $Cr^{+6}$[1] | PV[2] | SA[2] | Cat. Wt., gm. | Polymer Yield, gm. | Reactor Additive | Prod.[3] | MI | HLMI/MI | gm/mL Density | HI[4] (Mw/Mn) | Run Time (Min.) |
|---|---|---|---|---|---|---|---|---|---|---|---|---|---|
| 1 | Oven | 0.94 | 0.19 | 117 | .2620 | ~0 | None | Dead | — | — | — | | |
| 2 | Oven | 0.94 | 0.19 | 117 | .4570 | ~0 | 1 ppm TEB | Dead | — | — | — | | |
| 3 | Azeop. | 0.87 | 1.14 | 363 | .0795 | 296 | None | 3720 | HLMI = 2.41 | | 0.9600 | 16.0 | 50 |
| 4 | Azeop. | 0.87 | 1.14 | 363 | .0540 | 288 | 8 ppm TEB | 5330 | 0.31 | 172 | 0.9684 | 17.9 | 90 |
| 5 | Azeop. | 0.87 | 1.14 | 363 | .0625 | 250 | 50 psi $H_2$ 8 ppm TEB | 4000 | 1.24 | 112 | 0.9688 | 12.0 | 90 |

[1]By titration to the ferroin end point with divalent iron.
[2]PV = pore volume, SA = surface area in $m^2/g$; determined by $N_2$ absorption by B.E.T. method.
[3]Productivity, grams polymer per gram catalyst (g/g).
[4]HI is heterogeneity index The properties in this and subsequent examples were determined as follows:
Melt Index (MI) ASTM 1238-65, Condition E.
High Load Melt Index (HLMI) ASTM D 1238-65T, Condition F.
Density, grams per cc, ASTM D 1505-68.
$M_w/M_n$ from size exclusion chromatography.

The above table shows that the azeotrope dried catalyst was very active even without a cocatalyst. While the oven dried half was dead, this is probably due to the low porosity due to the sequence of washing and oven drying and is not representative of all oven dried preparations which, when used with a boron-containing

TABLE IA

| Run No. | Productivity, g/g | Run Time, Min. | MI | HLMI/MI | Density | ESCR[1] |
|---|---|---|---|---|---|---|
| 6 | 1930 | 60 | 0.12 | 240 | 0.9681 | 110 |

[1]Environmental Stress Crack Resistance.

ASTM D1693-70, Condition A (50° C.).

EXAMPLE II

This example illustrates production of this silica metal phosphate base by means of impregnating silica with aluminum phosphate or boron phosphate. The silica used in this example was a commercial grade of silica containing 1 weight percent chromium calculated on a dry basis of support plus chromium compound formed by spray drying a silica hydrogel having about 0.1 weight percent alumina containing an aqueous solution of chromium acetate. Essentially identical catalysts can be formed by impregnating 952 grade silica commercially available from Davison Chemical Company with an aqueous solution of chromium acetate and drying at about 200°–400° F. (129°–204° C.) in air. The polymerization runs were carried out as in Example I with the results shown hereinbelow in Table II.

TABLE II

AlPO₄ or BPO₄ Impregnated Onto Silica

| Run No. | Mole % Al | Atom Ratio P/Al | Preparation | Act. Temp. | Reactor Additive[12] | Run Temp, F. | Min. Run Time | g/g Prod. | MI[13] | HLMI | HLMI/MI | g/mL Den. | HI[14] | Mw | Mn | ESCR |
|---|---|---|---|---|---|---|---|---|---|---|---|---|---|---|---|---|
| 7 | 5 | 1.0 | Acid[2] | 500° C. | TEB | 205 | 30 | 1580 | 0 | 0.55 | — | .9623 | 33.2 | 515 | 15.5 | |
| 8 | 5 | 1.0 | Acid[2] | | TEB + H₂ | 205 | 90 | 1780 | 0.17 | 10.9 | 641 | .9652 | 25.1 | 276 | 11.0 | 82 |
| 9 | 5 | 1.0 | Basic (NH₄OH Vapor)[3] | | TEB | 205 | 90 | 1126 | 0 | 0.86 | — | .9648 | 43.2 | 570 | 13.2 | |
| 10 | 5 | 1.0 | Basic (NH₄OH Vapor)[3] | | TEB + H₂ | 205 | 45 | 2185 | 0.02 | 4.5 | 227 | .9623 | — | — | — | |
| 11 | 5 | 1.0 | Basic (NH₄OH Vapor)[3] | | TEB + H₂ | 205 | 70 | 2740 | 0.04 | 9.4 | 235 | — | — | — | — | |
| 12 | 5[1] | 1.0[1] | Acid[4] | 500° C. | TEB | 205 | 50 | 1625 | 0 | 7.6 | — | .9663 | 21.6 | 259 | 12.0 | |
| 13 | 5[1] | 1.0[1] | Acid[4] | | TEB | 205 | 90 | 1695 | 0.26 | — | 188 | .9658 | 15.7 | 196 | 12.5 | 23 |
| 14 | 5[1] | 1.0[1] | Acid[4] | | TEB + H₂ | 205 | 90 | 850 | 1.9 | — | 99 | .9700 | 12.7 | 119 | 9.4 | |
| 15 | 0 | | Control Catalyst[5] | 500° C. | TEB | 205 | 90 | 2220 | 0 | 0.15 | — | .9598 | 27.6 | 445 | 16.1 | |
| 16 | 0 | | Control Catalyst[5] | | H₂ + TEB | 205 | 90 | 705 | 0 | 1.8 | — | .9611 | 17.6 | 236 | 13.4 | |
| 17 | 2.5 | 0.8 | Acid[6] | 500° C. | TEB + H₂ | 205 | 60 | 3615 | 0 | 2.0 | | | | | | |
| 18 | 5 | 0.8 | Acid[7] | 500° C. | TEB + H₂ | 205 | 45 | 2820 | 0 | 4.8 | | | | | | |
| 19 | 10 | 0.8 | Acid[8] | 500° C. | TEB + H₂ | 205 | 60 | 3760 | 0 | 1.6 | | | | | | |
| 20 | 15 | 0.8 | Acid[9] | 500° C. | TEB + H₂ | 205 | 60 | 3070 | 0 | 2.7 | | | | | | |
| 21 | 25 | 0.8 | Acid[10] | 500° C. | TEB + H₂ | 205 | 60 | 2145 | 0 | 2.4 | | | | | | |
| 22 | 15 | 0.8 | Dry Mix Acid Melt[11] | 500° C. | TEB | 205 | 40 | 3320 | 0 | 4.9 | | | | | | |
| 23 | 15 | 0.8 | Dry Mix Acid Melt[11] | 500° C. | TEB | 205 | 60 | 4155 | 0 | 13.0 | | | | | | |
| 24 | 15 | 0.8 | Dry Mix Acid Melt[11] | | TEB + H₂ | 205 | 60 | 3460 | 0.25 | 56.0 | 224 | .9664 | | | | 57 |

[1] Boron instead of phosphorus.
[2] 20 Grams of the silica (⅓ mole) were slurried in water to which was added 1.2 mL H₃PO₄ + 6.15 grams Al(NO₃)₃·9H₂O. The solvent was boiled off on a hot plate and resulting xerogel activated in air at 500° C.
[3] 20 Grams of the silica (⅓ mole) were slurried in water to which was added 1.2 mL H₃PO₄ + 6.15 grams Al(NO₃)₃·9H₂O. Nitrogen was bubbled through ammonium hydroxide to carry ammonia to the slurry at 200° C. to form the gel which was then dried and activated at 500° C.
[4] 20 Grams of the silica (⅓ mole) were slurried in water and to this slurry was added 0.51 grams boric acid + 1.2 mL H₃PO₄. The solvent was boiled off on a hot plate and the resulting xerogel activated in air at 500° C.
[5] The chromium containing silica used in the above runs with no treatment.
[6] 94 Grams of Al(NO₃)₃ and 14 mL of H₃PO₄ were diluted in water to 300 mL. 10 Grams (1/6 mole) of the silica was slurried in water to which was added 5 mL of the above solution of AlNO₃ and H₃PO₄. The water was then evaporated off and resulting gel was activated at 500° C. in air.
[7] Same procedure as in footnote [6] except 10 mL of the solution were used.
[8] Same procedure as in footnote [6] except 20 mL of the solution were used.
[9] Same procedure as in footnote [6] except 30 mL of the solution were used.
[10] Same procedure as in footnote [6] except 50 mL of the solution were used.
[11] The following ingredients were mixed together and heated to melt: 94 grams Al(NO₃)₃·9H₂O; 23 grams ammonium dihydrogen phosphate; 2.4 grams Cr(NO₃)₃·9H₂O and 20 mL water. The final volume was 100 mL. 20 Grams of the silica described hereinabove was added to 20 mL of the above solution with much shaking and stirring. The pore volume of the silica was 1.67 cc per gram. Thus the silica should hold greater than 20 mL of solution and still be dry. After the solution was added to the silica and shaken, 10 mL of concentrated ammonium hydroxide (a stoichiometric amount) was added and it was shaken again. Since it was still dry to the touch, it was activated at 500° C, without further drying.
[12] TEB in runs 6-14 was 8 ppm by weight based on the weight of diluent. In runs 15-24 it was 4 ppm. Hydrogen pressure when used was 50 psi (0.34 MPa).
[13] MI, HLMI, Density, HI and ESCR determined as in prior examples.
[14] HI is the heterogeneity index, i.e. $M_w/M_n$.

A comparison of control run 15 with the other runs utilizing only TEB (i.e., no $H_2$) show higher melt index in every instance for the invention run which have the silica impregnated with aluminum phosphate or boron phosphate. Similarly, a comparison of control run 16 with all of the other runs shows that with hydrogen a higher melt index is obtained with the aluminum phosphate or boron phosphate impregnated silica than is obtained with the pure silica. These runs also show unusually broad molecular weight distribution as evidenced by high HI and in the few runs tested especially good environmental stress crack resistance especially when it is noted that the density is increased over the nominal 0.960 expected for an ethylene homopolymer.

EXAMPLE IIA

This example shows further examples of impregnation of a silica catalyst with $AlPO_4$ or $BPO_4$. The $AlPO_4$ catalysts were made by impregnating a silica of the type described in Example II with an aqueous solution of $Al(NO_3)_3 + H_3PO_4$ to equal 5 mole percent aluminum phosphate. The $BPO_4$ base was prepared by impregnating the silica with a solution of boric acid and orthophosphoric acid to equal 5 mole percent $BPO_4$. In each instance, the impregnated silica was dried and activated in air at 500° C. and tested for polymerization of ethylene at 205° F., 565 psia (3.99 MPa) and about 2 parts per million triethylborane based on reactor contents. The results are set out hereinbelow in Table IIA. This table shows that the impregnation with either aluminum phosphate or boron phosphate even though a gel may not be formed under these conditions greatly increases the melt flow sensitivity to hydrogen and produces broad molecular weight distribution polymers.

formed by forming the phosphate in the presence of the silica hydrogel and demonstrates good productivity, high melt index and high shear response.

EXAMPLE IIIA

In this example, 94 grams of $Al(NO_3)_3.9H_2O$ 23 grams ammonium dihydrogen phosphate plus 7.1 grams $Cr(NO_3)_3.9H_2O$, 100 ml $H_2O$ and 15 grams of Cabosil Grade S17, which is a flame hydrolyzed nonporous silica with a surface area of 400 square meters per gram was stirred well and heated 15 minutes at 30° C. Thereafter 50 ml concentrated ammonium hydroxide was added to make a gel. The resulting gel/silica mixture was washed in water and twice in acetone. Then it was dried in a vacuum oven at 60° C. and activated at 600° C. in air for three hours. In an ethylene polymerization run at 205° F. with 5 ppm TEB and 50 psia hydrogen, run for 60 minutes, the productivity was 5450, the melt index 6.68 and the HLMI/MI ratio was 80.

EXAMPLE IV

This example shows physical mixing of a silica based chromium catalyst and an aluminum phosphate based chromium catalyst. The silica based chromium catalyst was the silica described hereinabove in Example II, activated at 760° C. The aluminum phosphate catalyst was prepared by the melt method.

The phorphorus to aluminum atom ratio of the aluminum phosphate was 0.8. The chromium acetate was included in the phosphate preparation so as to cogel a sufficient amount of the chromium compound to give 1 weight percent chromium based on the weight of the final dried xerogel. Silica-based catalyst (0.0198 gram) and 0.0562 gram of the aluminum phosphate-based catalysts were separately added to the reactor along with 8

TABLE IIA

| Run No. | Additive | $H_2$ | Wt. Cat., g | Wt. Polymer, g | Prod., g/g | MI | HLMI/MI |
|---|---|---|---|---|---|---|---|
| 25 | None | 0 | 0.1440 | 320 | 2220 | 0.15 HLMI | |
| 26 | $AlPO_4$ | 0 | 0.2070 | 327 | 1580 | 0.55 HLMI | |
| 27 | $BPO_4$ | 0 | 0.2260 | 367 | 1625 | 7.6 HLMI | |
| 28 | None | 50 | 0.1735 | 122 | 705 | 1.8 HLMI | |
| 29 | $AlPO_4$ | 50 | 0.0905 | 161 | 1780 | 0.17 MI | 641 |
| 30 | $BPO_4$ | 50 | 0.1955 | 331 | 1695 | 0.26 MI | 188 |

EXAMPLE III

In this example, 94 grams of $Al(NO_3)_3.9H_2O$ plus 23 grams ammonium dihydrogen phosphate plus 7.1 grams $Cr(NO_3)_3.9H_2O$, 100 ml $H_2O$ plus 65 grams of Davison 952 silica hydrogel (30% solids) was stirred well and heated for 15 minutes at 30° C. Then 50 ml concentrated ammonium hydroxide was added to make a gel. The gel was washed in water once and twice in acetone and then dried in a vacuum oven at 60° C. Thereafter it was activated at 600° C. in air for 3 hours. The resulting catalyst was used in ethylene polymerization at 205° F. with 5 ppm TEB and 50 psia hydrogen with a 60 minute run time. The productivity was 5650, the melt index 5.84 and the HLMI/MI ratio was 85. This is an example of a 40/60 silica/aluminum phosphate combination parts per million triethylborane and 50 psi (0.34 MPa) hydrogen. The reaction was run for 30 minutes and yielded 249 grams of polymer which corresponds to a productivity of 3,280 g polymer per g catalyst or a productivity in grams polymer per gram catalyst per hour of 6560 assuming a linear response over the 60 minutes. The melt index was 2.6 and the HLMI/MI ratio was 86 which is very high.

EXAMPLE V

This example shows the different effects of TEB as cocatalyst with a chromium oxide catalyst on silica compared with catalysts of the invention having a silica/phosphate support. All of the catalysts had one weight percent chromium based on the weight of the dry base.

TABLE V

| Run No. | Reactor Additive ppm, TEB | Support | Prod. g/g | Density g/mL | Melt Index | Polymerization Time, min. | Remarks |
|---|---|---|---|---|---|---|---|
| 1 | 0 | Silica | 3330 | 0.962 | 0.58 | 70 | Prior art |
| 2[a] | 2.5 | Silica | 3450 | 0.955 | 0.15 | 37 | Prior art |
| 3[a] | 3.8 | Silica | 3890 | 0.952 | 0.21 | 45 | Prior art |

TABLE V-continued

| Run No. | Reactor Additive ppm, TEB | Support | Prod. g/g | Density g/mL | Melt Index | Polymerization Time, min. | Remarks |
|---|---|---|---|---|---|---|---|
| 4(b) | 0 | Silica/phosphate | 3720 | 0.960 | HLMI = 2.4 | 50 | Invention |
| 5(c) | 8 | Silica/phosphate | 5330 | 0.968 | 0.31 | 90 | Invention |

(a)The TEB for runs 2, 3 and 5 is calculated based on 600 g isobutane diluent and 0.03 g catalyst weight.
(b)Same as run 3, Table I.
(c)Same as run 4, Table I.

It can be seen in Table V with the prior art chromium oxide on silica catalyst (runs 1-3) that not only the melt index of the product decreases as TEB is added but that also the density of the product decreases. Apparently, some of the ethylene is converted into higher 1-olefins such as 1-butene which is copolymerized with the ethylene thus lowering the density of the product. Thus, if an ethylene homopolymer is desired, then the presence of TEB must be avoided.

On the other hand, it can be seen that in invention runs 4 and 5 that TEB increases the melt index of the product, increases the density of the product, and substantially increase the amount of polymer produced.

While this invention has been described in detail for the purpose of illustration, it is not to be construed as limited thereby but is intended to cover all changes and modifications within the spirit and scope thereof.

I claim:

1. A polymerization process comprising:
    contacting at least one mono-1-olefin having 2 to 8 carbon atoms per molecule under polymerization conditions in a polymerization zone with a catalyst system comprising:
    (a) a catalyst comprising a chromium component on a silica/phosphate support, said phosphate being selected from at least one of aluminum phosphate and boron phosphate;
    (b) a cocatalyst selected from organoaluminum compounds and organoboron compounds; and
    recovering a polymer.

2. A process according to claim 1 wherein said at least one mono-1-olefin is selected from ethylene, propylene, 1-butene, 1-butene, 1-hexene, and 1-octene and said polymerization is carried out under slurry conditions and said cocatalyst is a trialkylborane.

3. A method according to claim 1 wherein said catalyst comprising said chromium component on said silica/phosphate support is activated by heating in air at a temperature of 400°-600° C. and wherein said at least one mono-1-olefin is predominantly ethylene and said polymerization conditions include a temperature of 205° F.±5° F.

4. A method according to claim 1 wherein said cocatalyst is added to said polymerization zone as a separate stream from the catalyst.

5. A process according to claim 1 wherein said at least one mono-1-olefin comprises ethylene and 0.01 to 0.1 mole percent of one of propylene, 1-butene, 1-pentene, 1-hexene or 1-octene.

6. A polymerization process comprising:
    contacting at least one mono-1-olefin having 2 to 8 carbon atoms per molecule under polymerization conditions in a polymerization zone with a catalyst system prepared by a process comprising:
    (a) forming a silica hydrogel or xerogel;
    (b) impregnating said silica with a liquid medium containing a source of aluminum ions and a source of phosphate ions;
    (c) forming aluminum phosphate inside the pores of the silica by evaporating said liquid medium or by adding a neutralizing agent;
    (d) introducing a chromium component either by including a chromium component in said silica, or by coprecipitating the chromium component with said aluminum phosphate, or by adding said chromium component to the aluminum phosphate impregnated silica; and
    (e) activating the resulting chromium containing silica/phosphate composition by heating at a temperature of 150°-1000° C. in an oxidizing ambient; and
    recovering a polymer.

7. A polymerization process comprising:
    contacting at least one mono-1-olefin having 2 to 8 carbon atoms per molecule under polymerization conditions in a polymerization zone with a catalyst system comprising a cocatalyst selected from organoaluminum compounds and organoboron compounds and a catalyst prepared by a process comprising:
    (a) forming a silica;
    (b) impregnating said silica with a liquid medium containing a source of boron ions and a source of phosphate ions;
    (c) forming boron phosphate by evaporating said liquid medium to dryness;
    (d) introducing a chromium component either by including a chromium component in said silica or by coprecipitating said chromium component with said boron phosphate, or by adding said chromium component to the boron phosphate-impregnated silica;
    (e) activating the resulting chromium containing silica/phosphate composition by heating at a temperature of 150°-1000° C. in an oxidizing ambient; and
    recovering a polymer.

8. A process according to claim 7 wherein said at least one mono-1-olefin is selected from ethylene, propylene, 1-butene, 1-pentene, 1-hexene, and 1-octene and said polymerization is carried out under slurry conditions.

9. A method according to claim 7 wherein said at least one mono-1-olefin is predominantly ethylene and said polymerization conditions include a temperature of 205° F.±5° F.

10. A process according to claim 7 wherein said cocatalyst is triethyl borane.

11. A method according to claim 7 wherein said at least one mono-1-olefin comprises ethylene and 0.01 to 0.1 mole percent of one of propylene, 1-butene, 1-pentene, 1-hexene or 1-octene.

12. A polymerization process comprising:
contacting at least one mono-1-olefin having 2 to 8 carbon atoms per molecule under polymerization conditions in a polymerization zone with a catalyst system prepared by a process comprising:
(a) precipitating an aluminum phosphate hydrogel in the presence of a previously formed silica hydrogel or xerogel;
(b) removing water to convert the resulting aluminum phosphate hydrogel/silica mixture to a xerogel;
(c) introducing a chromium component either by including a chromium component in the silica, or by coprecipitating the chromium component with said aluminum phosphate, or by adding said chromium component to said resulting aluminum phosphate hydrogel/silica mixture, or by adding said chromium component to said xerogel; and
(d) activating the resulting chromium containing xerogel by heating at a temperature of 150°–1000° C. in an oxidizing ambient; and
recovering a polymer.

13. A process according to claim 12 wherein said at least one mono-1-olefin is selected from ethylene, propylene, 1-butene, 1-pentene, 1-hexene and 1-octene and said polymerization is carried out under slurry conditions.

14. A process according to claim 12 wherein said at least one mono-1-olefin is predominantly ethylene and said polymerization conditions include a temperature of 205° F.±5° F.

15. A process according to claim 12 wherein a cocatalyst is added to said polymerization zone.

16. A method according to claim 12 wherein said at least one mono-1-olefin comprises ethylene and 0.01 to 0.1 mole percent of one of propylene, 1-butene, 1-pentene, 1-hexene or 1-octene is in the feed.

17. A polymerization process comprising:
contacting at least one mono-1-olefin having 2 to 8 carbon atoms per molecule under polymerization conditions in a polymerization zone with a catalyst system prepared by a process comprising:
(a) mixing a silica xerogel and an aluminum orthophosphate xerogel;
(b) introducing a chromium component either by including the chromium component with each of the silica and aluminum phosphate components or by adding said chromium component to said mixture of silica and aluminum phosphate xerogels; and
(c) activating said silica and phosphate xerogels containing said chromium components either alone or together by heating at a temperature of 150°–1000° C. in an oxidizing ambient; and
recovering a polymer.

18. A process according to claim 17 wherein said at least one mono-1-olefin is selected from ethylene, propylene, 1-butene, 1-pentene, 1-hexene and 1-octene and said polymerization is carried out under slurry conditions.

19. A process according to claim 17 wherein said at least one mono-1-olefin is predominantly ethylene and said polymerization conditions include a temperature of 205° F.±5° F.

20. A process according to claim 17 wherein a cocatalyst is added to said polymerization zone.

21. A method according to claim 17 wherein said at least one mono-1-olefin comprises ethylene and 0.01 to 0.1 mole percent of one of propylene, 1-butene, 1-pentene, 1-hexene or 1-octene is in the feed.

22. A process according to claim 17 wherein said silica xerogel and phosphate xerogel are subjected to separate activation.

23. A process according to claim 17 wherein the activated silica xerogel and the activated said phosphate xerogel are added to said polymerization zone in separate streams.

* * * * *